March 16, 1948.   C. HOEH   2,437,917
APPARATUS FOR PREPARING LIVESTOCK FEED
Filed Jan. 10, 1947   2 Sheets-Sheet 2

INVENTOR,
CHARLES HOEH.
BY
ATTORNEY.

Patented Mar. 16, 1948

2,437,917

UNITED STATES PATENT OFFICE 2,437,917

APPARATUS FOR PREPARING LIVESTOCK FEED

Charles Hoeh, Santa Rosa, Calif.

Application January 10, 1947, Serial No. 721,303

5 Claims. (Cl. 259—24)

This invention relates to apparatus for preparing foods for livestock, and, more particularly, to improvements in apparatus for mixing ingredients of livestock feed, such as chopped hay and molasses.

It is common practice for dairymen and ranchers to prepare a mixture of chopped or ground hay or grain with molasses as a nutritious and inexpensive livestock food. It is also becoming increasingly apparent that certain vitamin-bearing food ingredients may be effectively utilized to supplement livestock diet. Usually mixing apparatuses are operated electrically or by means of gasoline or Diesel engines, or the like. Similarly, it is common practice to drive a hay-chopping mechanism or grain-grinding machine by means of a separate similar type power unit and equip the said mechanism with a blower to distribute the chopped material. Obviously, the use of two separate power units for the mixing and chopping machines is not economic and particularly so because of the usual location of the two types of machines under consideration. Generally, the chopping mechanism is located in the loft of a barn and it is not usually convenient or practicable to supply a separate power unit for a food mixing apparatus used to mix molasses with the chopped hay. Further, known mixing and chopping or grinding machines are not of the character adapted to be driven from a common power source.

It is an object of the present invention to provide a mixing apparatus for mixing chopped hay or grain with molasses and/or other materials and wherein the power source for operating the said mixing apparatus is the same power source as that utilized to operate the grinding or chopping machine. In this connection it is noted that the preparation of the grain or hay and mixing of that said material with molasses or other nutrient usually takes place at the point of use of the material, namely, a barn housing the cattle or other livestock by which the feed is to be consumed. Many times barns or other similar buildings are not equipped with adequate electrical outlets or with the proper facilities for handling more than one power source. It is a specific object of the present invention to provide a mixing apparatus for mixing hay and molasses and/or other food substance which is operated from a power source common to a hay-chopping or grain-grinding machine and yet which does not load said power unit beyond the power output necessary to drive normally the said hay-chopping or grinding machine.

It is a further object to provide a mixing apparatus of the character mentioned and wherein a plurality of materials may be mixed together thoroughly and in rapid and controlled fashion. Another object is to provide a mixing apparatus of the character described which is relatively inexpensive to manufacture and simple to operate and which may be cleansed with facility. A further object is to provide a mixing apparatus, wherein the mechanism for introducing molasses or other similar substances to chopped hay or the like is adapted for use with conventional hay choppers or grain grinders.

Further objects and advantages will become apparent upon reference to the accompanying specification and drawings, in which similar characters of reference represent corresponding parts in the several views.

Figure 1:
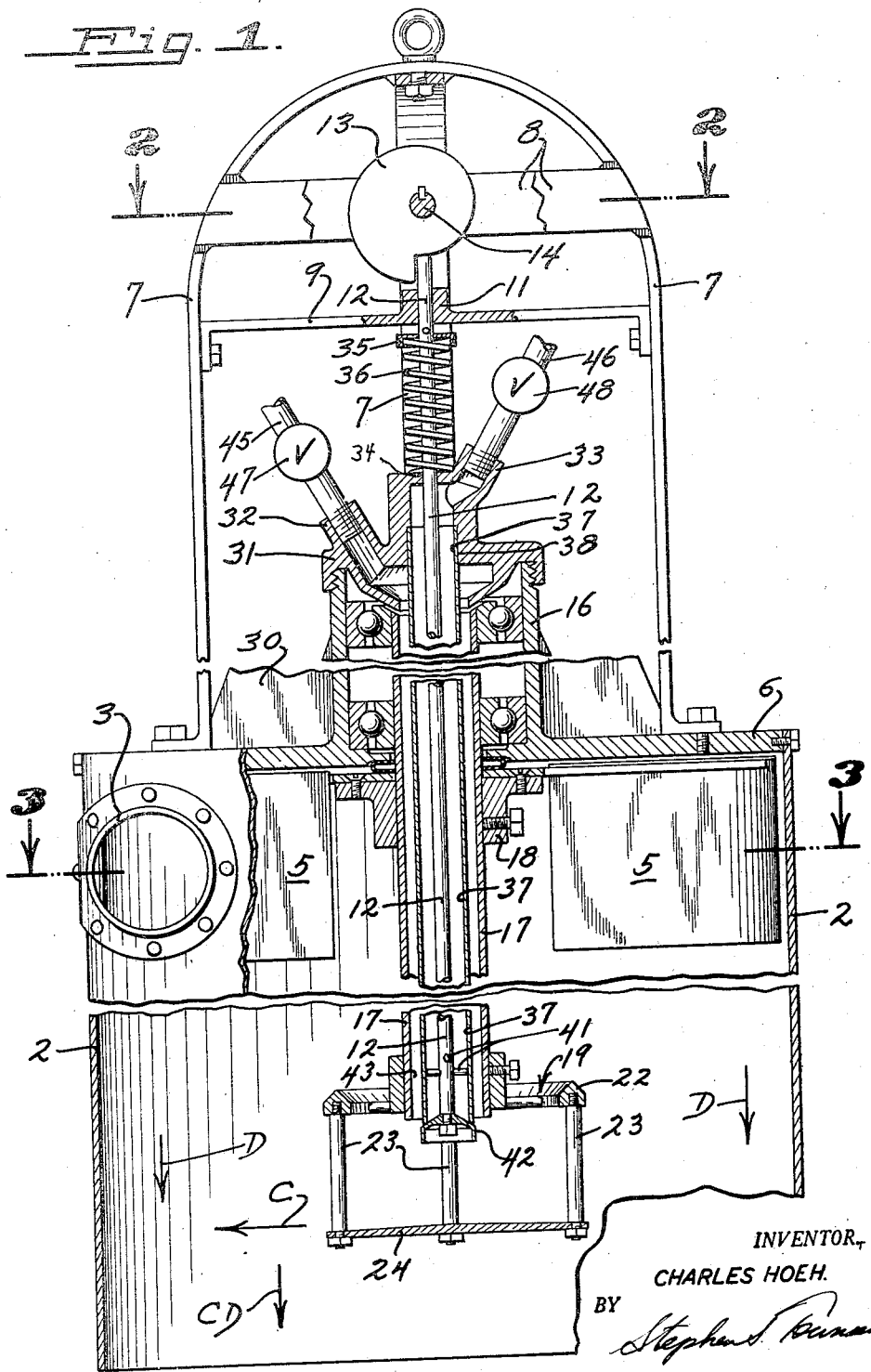
Fig. 1 is a vertical sectional view of the invention partly in elevation.
Figure 2:
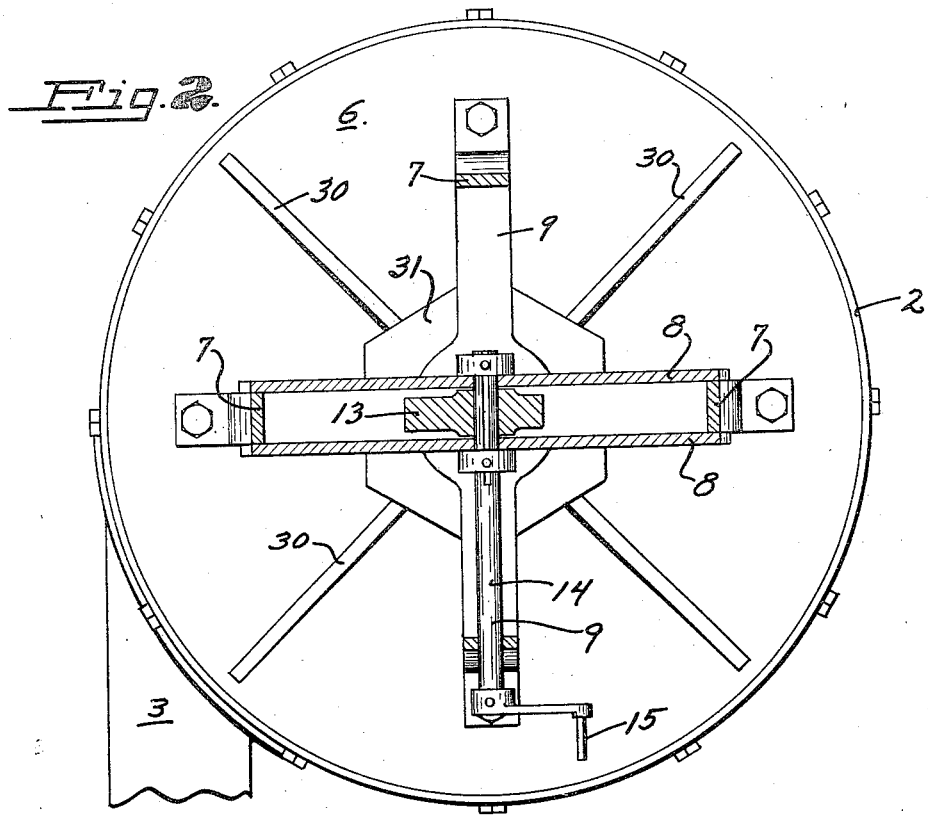
Fig. 2 is a view taken on line 2—2 of Fig. 1.

Referring to the drawings, there is indicated a mixing receptacle, generally indicated at 2, comprising a stationary cylindrical tank having an aperture 3 which is connected to a conduit 4 which leads to the distributing portion of a conventional hay chopper or grinder. The receptacle 2 is disposed vertically so that the bottom, which is usually open, may allow materials which are introduced into the receptacle to fall, by gravity therefrom, into a collector (not shown).

As has been previously noted, conventional hay choppers or grinders are provided with means operated by compressed air to convey the chopped grain from the chopping mechanism to a point of collection or away from the point of chopping or grinding. Consequently, the arrow A, shown in Fig. 3, indicates the direction of flow of chopped grains which travel in said conduit under pressure and enter the receptacle 2. The grains enter the receptacle and contact vanes 5 to cause rotation of said vanes and attached mechanism in the direction of arrows B, as will hereinafter shortly appear. The terms "hay-chopping machine" and "grain-grinding machine" are used interchangeably herein and each shall be understood to refer to and include the other. Further, the terms "hay" and "grain" shall be understood to refer to and include the other and any other foods or materials of similar qualitative characteristics.

The receptacle 2 carries a cover plate 6, to which is attached an arcuate spider 7 which supports cross-braces 8. Sub-cross-braces 9 form a bearing 11, in which is journaled a rod 12. The top end of the rod 12 contacts a cam 13 which is adapted to be rotated by means of a shaft 14 and handle 15. The rotation of the cam 13 causes reciprocation of the rod 12 relative to bearing 11, cover plate 6 and other related mechanism, as will hereinafter appear.

Cover plate 6 supports a main bearing housing 16, in which is mounted rotatably a tube 17 which extends downwardly into receptacle 2 axially thereof. A collar 18 is provided circumferentially of tube 17 below cover plate 6 and supports a plurality of radially disposed vane members 5.

Figure 3:
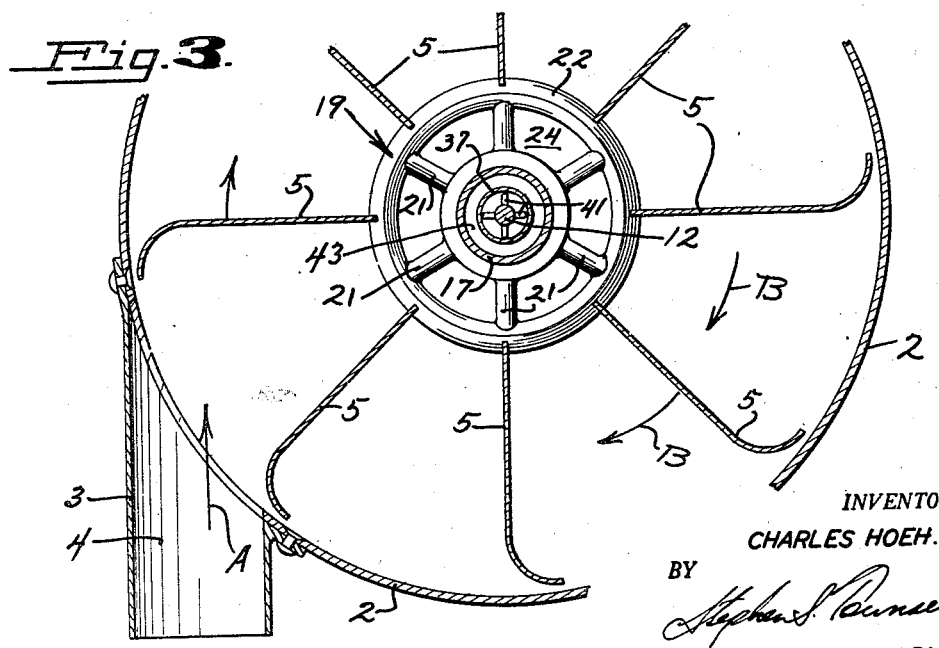
Fig. 3 is a view taken on line 3—3 of Fig. 1.

The bottom of the rotatable tube 17 carries a distributer mechanism, generally indicated at 19, which comprises a plurality of spokes 21, arranged circumferentially laterally of the tube 17 adjacent to the bottom thereof, which support a ring 22 which, in turn, carries a plurality of vertically depending spacer bars 23 which, in turn, carry a distributer plate 24 which is inclined slightly from the center thereof towards its periphery, as indicated in Fig. 3.

The cover plate 6 not only supports the main bearing housing 16 but also radially disposed bracing members 30 which aid in the support of the structure carried above the receptacle comprising the spider 7, braces 8 and 9 and other mechanism.

Positioned above the main bearing housing 16 and threadably attached thereto is a head member, indicated generally at 31, provided with connections 32 and 33. The rod 12 is journaled in the top of head member 31, as at 34, and is reciprocal relative thereto. The said rod 12 is provided with a cap 35, which is rigidly attached thereto, and a coil spring 36 is provided between the said cap 35 and top 34 of head member 31 and operates to bias the said shaft upwardly against the cam 13. A medial tube 37 is attached to the head member, as at 38, and is arranged concentrically and coaxially within tube 17 to form annular chamber 43. The rod 12 is disposed concentrically and coaxially within tube 37 and is reciprocal relative to said tube 37 and tube 17.

Tube 17, attached collar 18, vanes 5 and distributer 19 are rotatable relative to tube 37 and rod 12. Rod 12 carries a pin 41 which projects radially equidistantly therefrom to act as a centering means for said rod 12. The bottom of the rod 12 carries a conical valve plug 42, adapted to shut off delivery of material from tube 37 to distributer plate 24 and is adapted to be opened by reciprocation of the rod 12 relative to tube 37, and, as previously noted, is normally spring biased to closed position by means of spring 36.

In the operation of the instant apparatus, chopped hay travels, under pressure, through conduit 4, enters the receptacle 2 through aperture 3, and contacts vanes 5 to rotate them in the direction of arrows B. The vanes 5, attached to tube 17, cause rotation of said tube and attached distributer 19. Molasses or other nutrient material, usually of a fluid character, is introduced into tube 37 and/or chamber 43, through fluid connections 33, by way of conduits 45 and 46 which are respectively provided with suitable control valves 47 and 48. The cam 13 may be rotated by means of handle 15 to cause the rod 12 to be depressed, thereby opening the valve plug 42. Material contained within tube 37 flows by gravitation to the distributer plate 24 and is cast therefrom in the direction of the arrow C by means of centrifugal action to intersect and adhere to particles of hay falling by means of gravitational action, as indicated by arrows D. The mixed mass of material, indicated by arrow CD falls by gravitation to a collector or other point of suitable collection for storage and use.

While the invention has been illustrated as having more than two connections 32 and 33, it is obvious that only one or more than two such connections may be desirable or practical in particular installations.

While I have described my invention in more or less detail for purposes of clarity of description, example and illustration, it is to be understood that various changes, omissions and modifications may be practiced within the spirit of the invention and as defined by the appended claims.

I claim:

1. A mixing apparatus of the character described comprising a receptacle, a rotatable tube located centrally within said receptacle, propeller vanes attached radially to said tube in line of flow of material conveyed thereto under pressure, a distributer plate carried by said tube and positioned below and in alignment with the bottom end thereof and adapted to rotate therewith, said distributer plate and a portion of said tube disposed within said receptacle, a non-rotatable tube provided within said first named tube, means to control the introduction of additive material to said non-rotatable tube, and means to control emission of said additive material from said non-rotatable tube.

2. A mixing apparatus, according to claim 1, and wherein said means to control emission of additive material from said non-rotatable tube comprises a reciprocal rod disposed coaxially of said non-rotatable tube, and a valve plug enclosing the bottom end of said non-rotatable tube.

3. A mixing apparatus of the character described comprising a stationary receptacle open at the bottom end and having a cover plate disposed over the opposite end thereof, a rotatable tube disposed centrally within said receptacle and extended through said plate and provided with a distributer mechanism, said distributer mechanism comprising a distributer plate positioned below and in alignment with the bottom end of said tube, a plurality of radially disposed vanes rigidly attached to said rotatable tube below said cover plate of said receptacle, an aperture in said receptacle in alignment with said vanes, a non-rotatable medial tube disposed concentrically and coaxially within said central rotatable tube, means to introduce additive material into said medial tube, and means to control emission of said material from said medial tube.

4. A mixing apparatus of the character described comprising a stationary receptacle open at the bottom end and having a cover plate disposed over the opposite end thereof, a rotatable tube disposed centrally within said receptacle and extended through said plate and provided with a distributer mechanism, said distributer mechanism comprising a distributer plate positioned below and in alignment with the bottom end of said tube, a plurality of radially disposed vanes rigidly attached to said central tube below said cover plate of said receptacle, an aperture in said receptacle in alignment with said vanes, a non-rotatable medial tube disposed concentrically and coaxially within said rotatable tube, said distributer plate arranged so that material deposited thereon is cast therefrom by centrifugal action when said distributer mechanism is rotated by rotation of said rotatable tube, means to introduce additive material to said medial tube, and means to control emission of material from said medial tube.

5. A mixing apparatus according to claim 4 and wherein said means to control emission of material from said medial tube comprises a reciprocal rod disposed concentrically and coaxially within said non-rotatable medial tube and a valve plug carried by said rod, spring means to bias normally said plug to closed position, and means to reciprocate said rod relative to said non-rotatable tube.

CHARLES HOEH.

REFERENCES CITED

The following references are of record in the file of this patent:

UNITED STATES PATENTS

| Number | Name | Date |
| --- | --- | --- |
| 490,525 | Werner | Jan. 24, 1893 |
| 646,686 | Du Bois | Apr. 3, 1900 |
| 1,344,148 | Rockola | June 22, 1920 |
| 1,855,548 | Forster | Apr. 26, 1932 |
| 2,074,673 | Sackett | Mar. 23, 1937 |
| 2,159,499 | Bohner et al. | May 23, 1939 |